(12) United States Patent
Berger et al.

(10) Patent No.: US 8,335,656 B2
(45) Date of Patent: Dec. 18, 2012

(54) SHORT-CIRCUIT RECOGNITION METHOD FOR AN ELECTRIC NETWORK

(75) Inventors: Frank Berger, Manebach (DE); Timo Mützel, Burkardroth (DE)

(73) Assignee: Siemens Aktiengesellschaft, Munich (DE)

( * ) Notice: Subject to any disclaimer, the term of this patent is extended or adjusted under 35 U.S.C. 154(b) by 274 days.

(21) Appl. No.: 12/740,229

(22) PCT Filed: Oct. 10, 2008

(86) PCT No.: PCT/EP2008/063577
§ 371 (c)(1),
(2), (4) Date: Apr. 28, 2010

(87) PCT Pub. No.: WO2009/056432
PCT Pub. Date: May 7, 2009

(65) Prior Publication Data
US 2010/0312505 A1 Dec. 9, 2010

(30) Foreign Application Priority Data

Oct. 30, 2007 (DE) .......................... 10 2007 052 963

(51) Int. Cl.
*G01R 31/00* (2006.01)
(52) U.S. Cl. .............. 702/58; 702/59; 702/64; 702/117; 702/183; 702/189
(58) Field of Classification Search .............. 702/57–58, 702/64, 185
See application file for complete search history.

(56) References Cited

U.S. PATENT DOCUMENTS

| 6,313,639 | B1  |   | 11/2001 | Griepentrog |
| 6,437,576 | B2  | * | 8/2002  | Lorito ........................... 324/509 |
| 6,665,591 | B1  | * | 12/2003 | Griepentrog et al. ......... 700/292 |

(Continued)

FOREIGN PATENT DOCUMENTS

DE    1 588 096 A    8/1971

(Continued)

OTHER PUBLICATIONS

T & M Research Products Inc., "Current Viewing Probe", no date, pp. 35-36.*
International Search Report, Apr. 3, 2009.

*Primary Examiner* — Michael Nghiem
*Assistant Examiner* — Mischita Henson
(74) *Attorney, Agent, or Firm* — Harness, Dickey & Pierce, P.L.C.

(57) ABSTRACT

A short-circuit recognition method is disclosed, especially an early short-circuit recognition method, for an electric network. In at least one embodiment, in order to improve the switching times of protective devices, the current and the first and second temporal derivation thereof are continuously and consecutively determined at the same time and in the same temporal distance and are processed as respective digital sequences of numbers. Every sequence of numbers is associated with a defined threshold value, the numbers of the three sequences of numbers being compared with the respective threshold value associated therewith. Every number that exceeds the threshold value associated therewith is associated with a weighting variable and the weighting variables that pertain to the same time are added up to a first weighting sum. The first weighting sums are added to a second weighting sum for a defined number of directly subsequent times and the second weighting sum is compared with an additional defined threshold value. When the second weighting sum exceeds the defined threshold value, a short circuit is recognized.

2 Claims, 6 Drawing Sheets

U.S. PATENT DOCUMENTS

| | | | |
|---|---|---|---|
| 6,724,597 B1 * | 4/2004 | Elischer et al. | 361/93.6 |
| 6,844,737 B2 * | 1/2005 | Leprettre et al. | 324/511 |
| 7,265,320 B2 * | 9/2007 | Ou | 219/137 PS |
| 7,405,569 B2 * | 7/2008 | Hagel et al. | 324/421 |
| 7,705,623 B2 * | 4/2010 | Hobelsberger | 324/765.01 |
| 7,902,813 B2 * | 3/2011 | Kojovic et al. | 324/127 |
| 7,936,549 B2 * | 5/2011 | Takeuchi et al. | 361/139 |
| 2011/0128654 A1 * | 6/2011 | Wu | 361/18 |

FOREIGN PATENT DOCUMENTS

| | | |
|---|---|---|
| DE | 36 42 136 C2 | 11/1989 |
| DE | 10 2008 019 467 A1 | 10/2007 |
| FR | 2 255 608 A1 | 7/1975 |
| GB | 1355827 A * | 6/1974 |
| JP | 2003047145 A * | 2/2003 |

* cited by examiner

SHORT-CIRCUIT RECOGNITION METHOD FOR AN ELECTRIC NETWORK

PRIORITY STATEMENT

This application is the national phase under 35 U.S.C. §371 of PCT International Application No. PCT/EP2008/063577 which has an International filing date of Oct. 10, 2008, which designates the United States of America, and which claims priority on German patent application number DE 10 2007 052 963.7 filed Oct. 30, 2007, the entire contents of each of which are hereby incorporated herein by reference.

FIELD

At least one embodiment of the invention generally relates to a method for short-circuit identification, in particular for early short-circuit identification, in electrical power supply systems.

BACKGROUND

In general, every electrical power supply system must be protected against short circuits in the system. Automatic fuses are provided for this purpose in the field of private building installation. In industry, in particular for electrical installations or machines, this protection is achieved by protective devices in the form of circuit breakers which are opened via appropriate tripping units in the event of a short circuit.

In the event of a short circuit, protective devices such as these first of all limit the current flowing in order to protect both the electrical installations (cables, busbars, etc.) and the connected loads (machines, etc.). The current limiting reduces the dynamic loads (resulting from the square of the current) and the thermal loads (resulting from the integral of the square of the current) on an electrical installation in the event of a short circuit. The load depends on the response time of the switch, which, as far as possible, should be less than 0.5 ms. The response time depends in particular on the time (self response time) which the electronic evaluation unit requires to identify a short circuit.

The problem of long short-circuit identification times (much more than 100 µs) of electronic tripping units is also particularly evident from characteristic diagrams of circuit breakers. If one compares the switching-off characteristics of two circuit breakers having an identical mechanical design and different tripping units (electronic and thermo-magnetic), then, particularly in the case of high short-circuit currents, a circuit breaker with an electronic tripping unit has a considerably longer switching-off time. This entails high loading of the installation to be protected on account of the relatively long action time, and also has an adverse effect on the switching capacity of the circuit breakers themselves as a result of the high amount of energy converted in the switch.

In many electronic releases, a short circuit is identified by comparing the instantaneous value of the current flowing with a threshold value, and this could take a relatively long time, depending on the nature of the short circuit.

In order to reduce the time before identification of a short circuit, it has already been proposed that the gradient of the current curve (first time derivative of the current) be considered as an alternative criterion. This type of tripping responds only to the gradient of the current curve, but not to the current level that is reached. Initially, this criterion was applied only to shorten the switching-off times of quick-action direct-current switches, since the relationship between the rate of current rise, the short-circuit current and the voltage in single-phase and polyphase systems is dependent on the time of the short circuit and on the power factor in the power supply system.

The combination of both criteria, the instantaneous value of the current and the current gradient, is proposed in DE 36 42 136 C2. For this purpose a sensor, for example a Rogowski converter, is used to determine the current gradients in every main current path. This is linked to formation of digital value pairs comprising a current gradient and an instantaneous value of the current, which are compared with predetermined threshold values. This comparison is preferably carried out using a locus curve criterion. The disadvantage of the algorithm described in DE 36 42 136 C2 is that it allows switching processes to be assessed only without an initial current. Changes in the power factor, for example caused by large machines being connected or disconnected, or other changes in the current, can thus themselves lead to tripping even though they are still within the permissible range.

DE 015 88 096 A uses the sum of the first and second derivatives of the current as a criterion for short-circuit identification. The second derivative is in this case produced by an LC circuit from the first derivative of the current, for which reason the signal is subject to a compensation element. Furthermore, because of the LC circuit, the signal is at a relatively low power level, making its evaluation more difficult. DE 015 88 096 A does not provide any details as to how to determine the response value g and how to determine the factors x and y.

SUMMARY

At least one embodiment of the invention specifies a method for improving the switching time of protective devices.

The solution provides that the current and its first and second time derivatives are each determined continuously and successively at the same time and at the same time interval, and are in each case processed further as a digital numerical sequence, that each numerical sequence is allocated a limit value, that the numbers in the three numerical sequences are compared with the respectively associated limit value, that each number which exceeds the associated limit value is allocated a weighting number, that the weighting numbers which belong to the same time are in each case added to form a first weighting sum, that the first weighting sums are in each case added up for a number of immediately successive times to form a second weighting sum, that the second weighting sum is compared with a further predetermined limit value, and that a short circuit is considered to have been identified if the second weighting sum exceeds the predetermined limit value. The method according to at least one embodiment of the invention allows short-circuit identification times of less than 100 µs, and therefore considerably improves the current-limiting characteristics of a corresponding electrical power supply system.

It is technically simple in each case to determine the first time derivative continuously and successively at the same time and at the same time interval, and to use the first time derivative to calculate the current by integration, and its second time derivative by differentiation.

BRIEF DESCRIPTION OF THE DRAWINGS

The invention will be described in more detail in the following text with reference to one example embodiment. In the figures.

DETAILED DESCRIPTION OF THE EXAMPLE EMBODIMENTS

Figure 1:
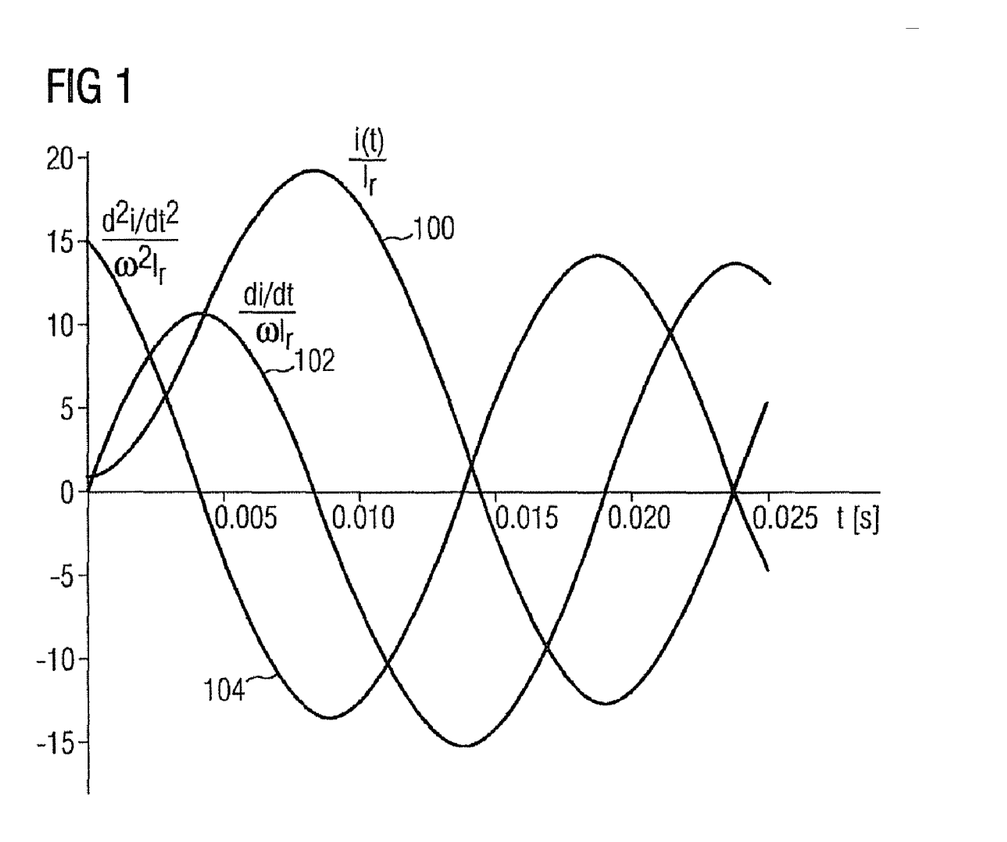
FIG. 1 shows the waveform of a short-circuit current and its first and second derivatives.
Figure 7:
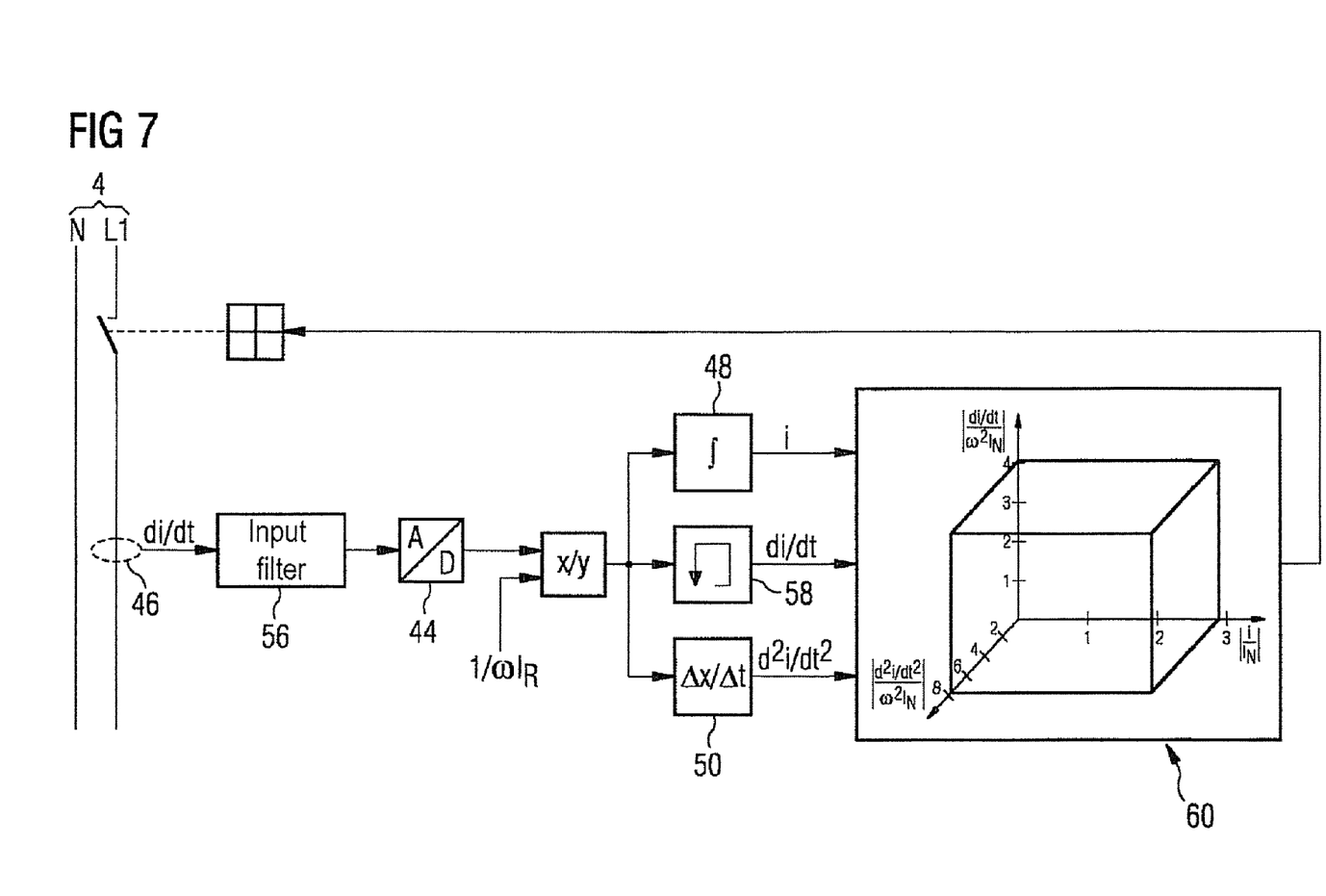
FIG. 7 shows an arrangement for carrying out an embodiment of the method for short-circuit identification.

FIG. 1 shows a typical waveform of the current 100 (i plotted against the time t: i(t)) and its first and second time derivatives 102, 104 in the event of a short circuit in an electrical power supply system 4 (see FIG. 7). As can be seen from FIG. 1, the second time derivative 104 leads the two other curves 100, 102 in time.

Figure 2:
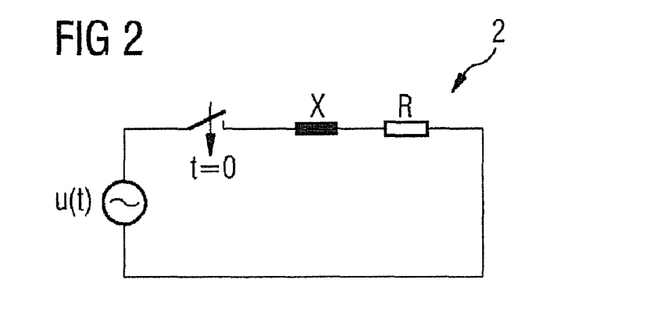
FIG. 2 shows the equivalent circuit of an electrical power supply system in the form of a resistive-inductive circuit.

FIG. 2 shows the equivalent circuit 2 of the electrical power supply system 4, which is approximated as a resistive-inductive circuit, having a resistance R, a reactance X and a compact circuit breaker, which is provided with an electronic tripping unit, which is not shown. The resistance R and the reactance X in this case represent the electrical installation to be protected.

The following differential equation for the switching-on process of the single-phase resistive-inductive circuit at a frequency ω can be derived from the equivalent circuit 2 at a rated voltage (root mean square value) $U_N$ and a phase angle Ψ of the voltage u as a function of the time t:

$$u(t) = \sqrt{2} \cdot U_N \cdot \sin(\omega t + \psi) = R \cdot i + L \frac{\partial i}{\partial t}$$

The inrush current is described in the time domain, with a phase shift $$\varphi = \arctan \frac{X}{R}$$

and a rated current (root mean square value) $I_N$ by the following equation:

$$i(\psi, \varphi, t)/I_N = \sqrt{2} \cdot \left[ \sin(\omega t + \psi - \varphi) - \sin(\psi - \varphi) \cdot e^{-\frac{\omega t}{\tan \varphi}} \right]$$

The second derivative of the current i is obtained from this by double differentiation:

$$\frac{\partial^2 i}{\partial t^2} / (\omega^2 \cdot I_N) = -\sqrt{2} \cdot \left[ \sin(\omega t + \psi - \varphi) + \frac{1}{\tan^2 \varphi} \cdot \sin(\psi - \varphi) e^{-\frac{\omega t}{\tan \varphi}} \right]$$

Figure 3:
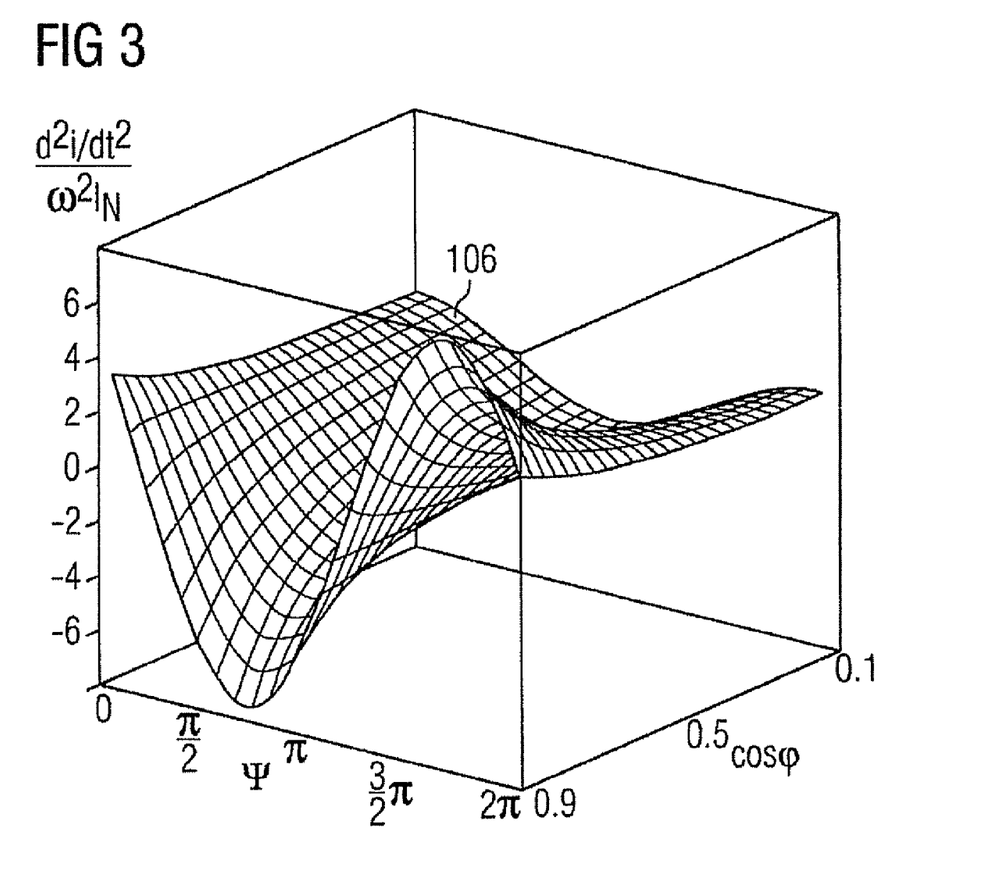
FIG. 3 shows a normalized illustration of the second derivative of the current at the switching-on time for the power supply system shown in FIG. 2, FIGS. 4, 5 show locus curves of switching-on processes of resistive-inductive circuits for different switching-on phase angles of the voltage.

FIG. 3 shows a representation, normalized with respect to $\omega^2 I_N$, of the second derivative 106 of the current at the switching-on time of the resistive-inductive circuit t=0, in each case with a lower power factor cos $\phi_u$=0.1 and an upper power factor cos $\phi_0$=0.9 over various phase angles ψ.

Figure 4:
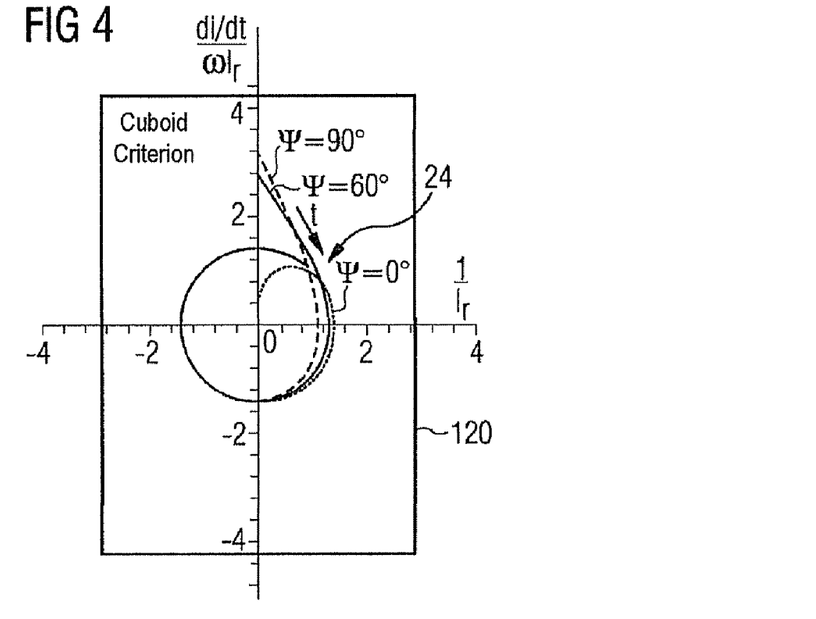
Figure 5:
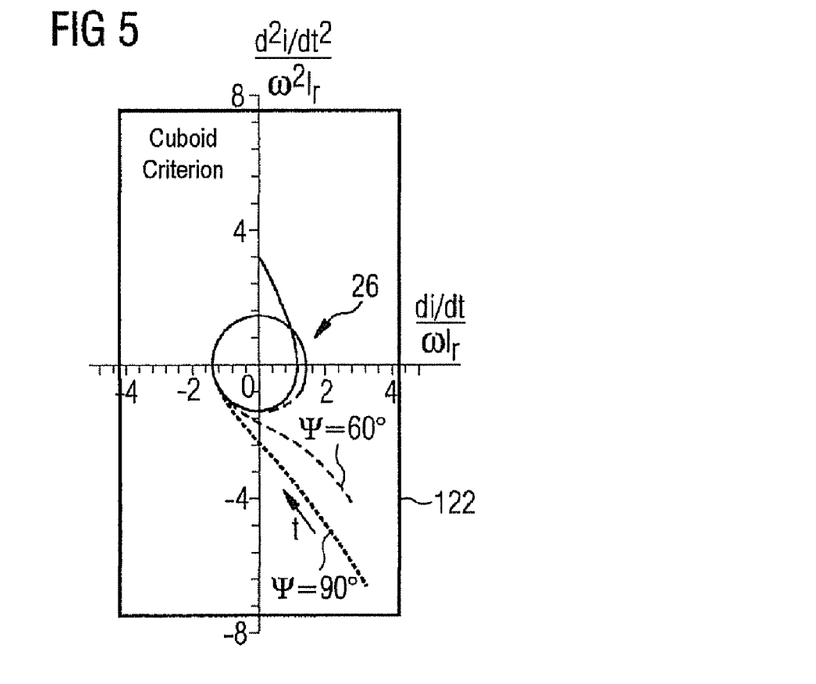

FIG. 4 and FIG. 5 show examples of locus curves 24 and 26 for switching-on processes in resistive-inductive circuits with a different switching-on phase angle ψ of the voltage u (Ir is in this case the current set value for the electronic tripping unit, which is delayed as a function of the current).

The envelope of the locus curves can be determined by theoretical analyses and simple simulations, by superimposition of the locus curves within a defined power-factor range and switching-angle range. As will be described in the following text, limit values can be derived from the envelope, in particular for resistive-inductive circuits.

For simplicity, the limit values (in this case of the locus curve tripping criterion) are approximated in the following text by an enveloping cuboid 120, 122; this simplified tripping criterion is therefore referred to in the following text as the cuboid criterion.

At a switching-on phase angle $\psi_{max}$ of the voltage u $$\psi_{max} = \varphi_o + \frac{\pi}{2}$$

the maximum value of the second derivative for cos $\phi_o$=0.9 at the switching-on time t=0 is:

$$\left. \frac{\partial^2 i / \partial t^2}{\omega^2 I_r} \right|_{max} = \frac{\sqrt{2}}{\sin^2 \varphi_o}.$$

Figure 6:
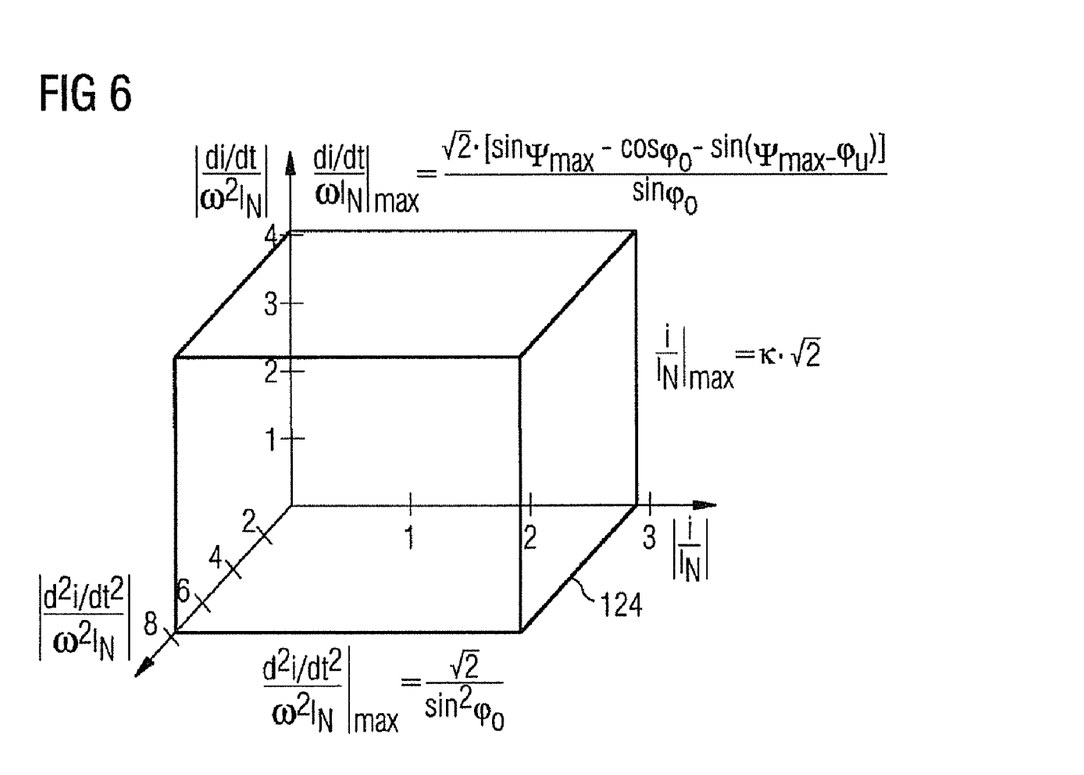
FIG. 6 shows a three-dimensional limit cuboid.

Using this maximum value of the second derivative as a limit value (tripping limit value or tripping threshold value), the two other limit values illustrated in FIG. 6 are defined for the cuboid criterion. In this case, FIG. 6 shows only the magnitudes of the current i and the magnitudes of its first and second derivatives, and therefore also only one eighth of the cuboid 124 in three-dimensional (positive and negative) space.

FIG. 7 schematically shows an apparatus for carrying out the method for quick (early) identification of a short circuit in an electrical power supply system 4. A Rogowski coil 46 is preferably used as the sensor. A downstream input filter prevents spurious tripping, caused by harmonics in the current signal, thus allowing use in particular in industrial power supply systems with loads fed from converters/inverters. The first derivative of the current i, filtered in this way, is digitized by an A/D converter 44 for further processing, is then normalized (normalizer x/y) and is differentiated by backward subtraction by a differentiator 50

$$\frac{\partial^2 i(t)}{\partial t^2} \approx \frac{\frac{\partial i(z)}{\partial t} - \frac{\partial i(z-1)}{\partial t}}{\Delta t}$$

and is integrated by an integrator 48, using the trapezoidal rule:

$$\Im(f) = (b-a)\frac{f(a)+f(b)}{2} \approx \int_a^b f(x)dx,$$

in which case the integration produces the current i in this case.

The evaluation is then carried out in the evaluation unit 60 associated with the tripping unit.

Figure 8:
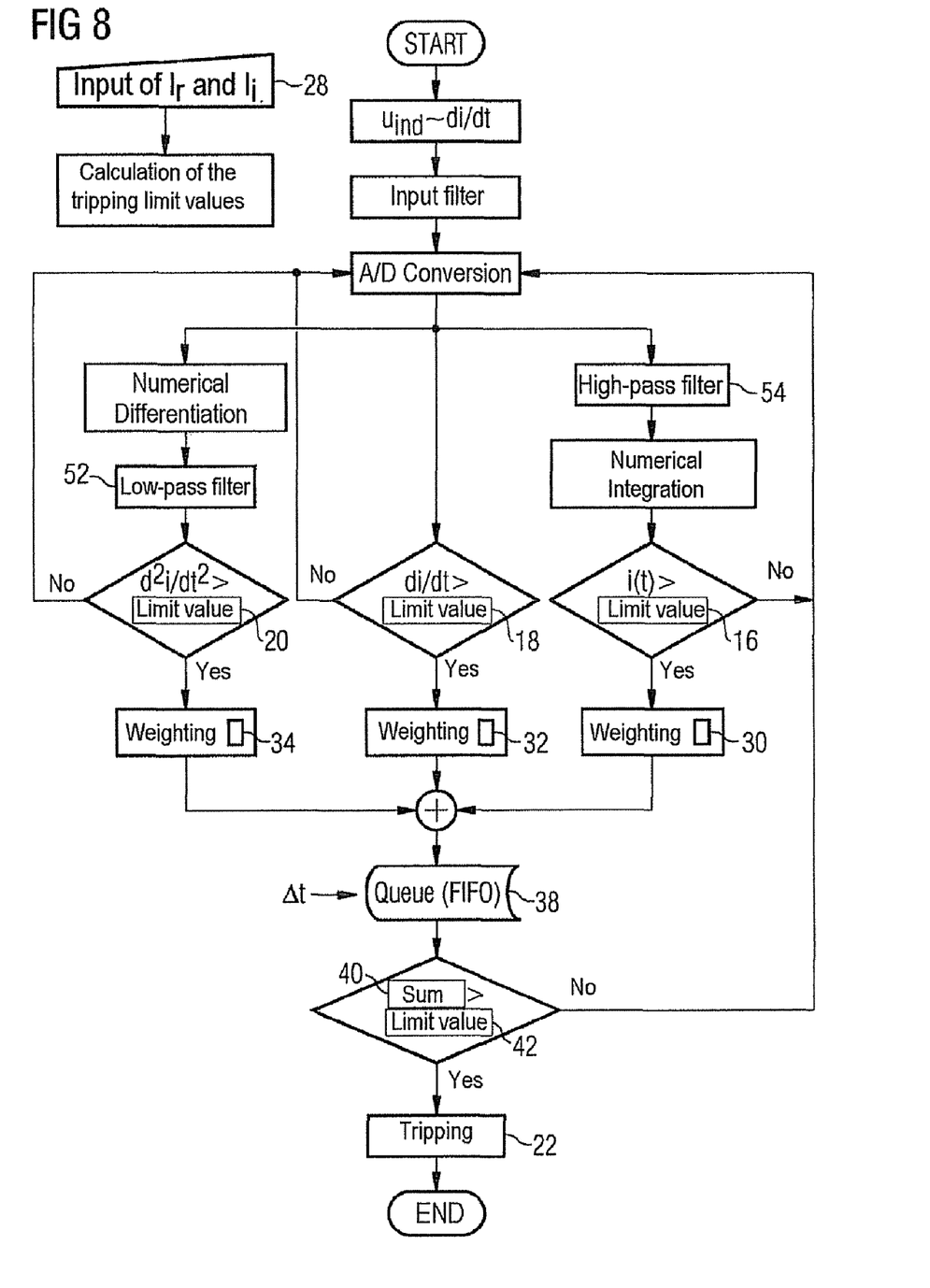
FIG. 8 shows a flowchart for the arrangement shown in FIG. 7.

FIG. 8 shows a flowchart of the evaluation on the basis of the current i and its first and second time derivatives, which are each determined immediately successively at the same time t and at the same time interval Δt, and which are each available as digital numerical sequences after the A/D conversion. The A/D conversion, and therefore the digitizing process, can, of course, also be carried out before the input filter 56 or after the normalization (normalizer x/y).

Since the Rogowski coil 46 itself produces the first derivative, the second derivative is formed from this—as described above—by numerical differentiation, and the current i is formed by numerical integration, on the one hand by way of subsequent filtering (low-pass filter 52) and on the other hand by way of initial filtering (high-pass filter 54). The low-pass filter 52 attenuates high-frequency components which are amplified by the differentiation process. The high-pass filter 54 compensates for the errors resulting from constant terms in the numerical integration.

The three digital numerical sequences which have been processed in this way are then applied to the inputs of the evaluation unit 60, which compares their numbers with the limit value (tripping limit value or tripping threshold value) 16, 18, 20 associated with that of the numerical sequence. Each numerical sequence has its own associated limit value 16, 18, (16 for the current i, 18 for the first derivative and 20 for the second derivative).

The limit values 16, 18, 20 are those of the cuboid criterion, as described above, of the enveloping cuboid 120, 122, and are calculated in a corresponding manner (as described above for the resistive-inductive circuit).

Since electrical power supply systems 4, in particular those using low-voltage technology, cannot be represented completely by a purely resistive-inductive system, matching is carried out using a response value 28 (after inputting the current set value Ir of the tripping unit, which is delayed as a function of the current, and if appropriate the current set value Ii of the undelayed tripping unit) (for matching in particular to switching-on processes of machines, transformers (inrush currents) and lines as well as capacitive loads, for example power-factor correction installations). For resistive-inductive circuits, this response value 28 corresponds to the numerical value 2. For other loads, for example machines with high inrush currents, the response value must be chosen appropriately. This therefore allows the method to be matched not only to the entire range of resistive-inductive systems but also to other systems, therefore allowing an extended range of operation.

If one of the numbers exceeds the respective limit value 16, 18 or 20 associated with this numerical sequence, then this means that this number is outside the cuboid, and therefore that there could be a fault in the form of a short circuit. Each of these numbers which exceeds the associated respective limit value 16, 18 or 20 is allocated a weighting number 30, 32, 34: the weighting number 1, when the number in the numerical sequence of the current i exceeds the limit value 16; the weighting number 0.5, when the number in the numerical sequence of the first derivative exceeds the limit value 18, and the weighting number 0.25, when the number in the numerical sequence of the second derivative exceeds the limit value 20. The current i is given the highest weighting, since its value is a comparatively reliable criterion for the presence of a short circuit. In principle, the weighting is a function of the power supply system configuration or of the loads and equipment to be protected.

The weighting numbers 30, 32, 34 which are associated with the same time are in each case added to form a first weighting sum and are passed to a queue 38, for buffer storage, which is in the form of a FIFO memory and can in each case hold ten first weighting sums. After each time interval Δt, that is to say for each sampling time interval of the A/D converter, these first weighting sums are shifted on by one place, as a result of which the oldest of these first weighting sums in each case falls out. If no number exceeds the respectively associated limit value 16, 18 or 20 at a time t, then this place in the FIFO memory remains empty. This is the situation during normal operation, where all the numbers in the three numerical sequences are within the enveloping cuboid 120, 122.

The ten first weighting sums in the FIFO memory, which are associated with directly successive times, are in each case added to form a second weighting sum 40 and are compared with a further predetermined limit value 42 (tripping threshold value), for which the numerical value 3 has been preset here. If the evaluation unit 60 identifies that the second weighting sum, that is to say the sum of the queues 38, exceeds the defined limit value 42, then it initiates tripping 22 of the compact circuit breaker by the electronic tripping unit.

The first weighting numbers are chosen such that tripping is impossible solely as a result of the limit value 20 for the second derivative being exceeded.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for identification of a short circuit in an electrical power supply system including an associated tripping unit, sensor, evaluation unit and circuit breaker, the method comprising:
   determining, by the sensor, a current and a first and second time derivative of the current, continuously and successively at the same time and at the same time interval;
   processing, by the evaluation unit, each of the determined current and a first and second time derivative of the current as a digital numerical sequence;
   allocating, by the evaluation unit, each of the numerical sequences a limit value;
   comparing, by the evaluation unit, each of the numbers in the three numerical sequences with a respectively allocated limit value;
   allocating, by the evaluation unit, each number, which exceeds its allocated limit value based upon the comparison, a weighting number;
   adding, by the evaluation unit, the weighting numbers which belong to the same time to form a first weighting sum;
   adding, by the evaluation unit, up the first weighting sums for a number of immediately successive times to form a second weighting sum;
   comparing, by the evaluation unit, the second weighting sum with a further limit value; and
   considering, by the evaluation unit, a short circuit to have been identified if the second weighting sum exceeds the further limit value.

2. The method as claimed in claim 1, wherein the first time derivative is in each case determined continuously and successively at the same time and at the same time interval, and wherein the first time derivative is used to calculate the current by integration, and the second time derivative is used to calculate the current by differentiation.

* * * * *